(12) United States Patent
Ide

(10) Patent No.: US 11,912,305 B2
(45) Date of Patent: Feb. 27, 2024

(54) AUTOMATED DRIVING VEHICLE

(71) Applicant: TOYOTA JIDOSHA KABUSHIKI KAISHA, Toyota (JP)

(72) Inventor: Hirohito Ide, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 17/514,759

(22) Filed: Oct. 29, 2021

(65) Prior Publication Data
US 2022/0194421 A1 Jun. 23, 2022

(30) Foreign Application Priority Data
Dec. 18, 2020 (JP) ................. 2020-209878

(51) Int. Cl.
*B60W 60/00* (2020.01)
*B60W 30/14* (2006.01)
*G06V 20/58* (2022.01)

(52) U.S. Cl.
CPC ...... *B60W 60/0011* (2020.02); *B60W 30/146* (2013.01); *B60W 60/0017* (2020.02); *B60W 60/00253* (2020.02); *G06V 20/58* (2022.01); *B60W 2554/4044* (2020.02); *B60W 2554/801* (2020.02); *B60W 2554/802* (2020.02)

(58) Field of Classification Search
CPC .......... B60W 60/0011; B60W 30/146; B60W 60/0017; B60W 60/00253; B60W 2554/4044; B60W 2554/801; B60W 2554/802; B60W 30/09; B60W 40/02; B60W 60/0015; G06V 20/58
See application file for complete search history.

(56) References Cited

U.S. PATENT DOCUMENTS

2019/0317515 A1 10/2019 Zhang et al.
2020/0307632 A1* 10/2020 Tsuji .................. B60W 30/181

FOREIGN PATENT DOCUMENTS

JP 2019-206327 A 12/2019

* cited by examiner

*Primary Examiner* — Isaac G Smith
*Assistant Examiner* — Nikki Marie M Molina
(74) *Attorney, Agent, or Firm* — Dinsmore & Shohl LLP

(57) ABSTRACT

During a period from when an automated driving vehicle starts pulling over to a sidewalk side until the vehicle pulls over completely thereto, an operation control section causes the vehicle to immediately stop when an object that can be an obstacle exists in at least one of a middle front area, a sidewalk-side front area, and a sidewalk-side side area that are areas each within a predetermined distance at a middle front, at a sidewalk-side front, and on a sidewalk-side side of the vehicle, respectively. During the period, the operation control section does not cause the vehicle to stop when the object does not exist in any of the middle front area, the sidewalk-side front area, and the sidewalk-side side area, even when the object exists in an area surrounding the vehicle other than the middle front area, the sidewalk-side front area, and the sidewalk-side side area.

3 Claims, 5 Drawing Sheets

AUTOMATED DRIVING VEHICLE

CROSS-REFERENCE TO RELATED APPLICATION

This application claims priority to Japanese Patent Application No. 2020-209878 filed on Dec. 18, 2020, incorporated herein by reference in its entirety.

BACKGROUND

1. Technical Field

The present description discloses an automated driving vehicle equipped with a sensor that detects an object existing around the own vehicle.

2. Description of Related Art

In recent years, automated driving vehicles capable of automated driving have been proposed. In some cases, an automated driving vehicle is provided with a sensor for detecting an object existing around the own vehicle.

For example, Japanese Unexamined Patent Application Publication No. 2019-206327 discloses a method in which when a sensor provided to an automated driving vehicle detects an obstacle, the automated driving vehicle is caused to travel along such a trajectory that avoids the obstacle.

SUMMARY

When a sensor provided to an automated driving vehicle detects an object around the automated driving vehicle, it is conceivable that control of causing the automated driving vehicle to immediately stop is performed. However, in a case, in an attempt to perform such control, of causing the automated driving vehicle to pull over to a sidewalk side (as an example, in a case where the automated driving vehicle is a bus and is caused to stop at a bus stop), a problem can arise that the automated driving vehicle is caused to stop unnecessarily when the sensor detects an object in a direction other than a traveling direction of the automated driving vehicle.

An object of an automated driving vehicle disclosed in the present description is to restrain the automated driving vehicle from being stopped unnecessarily when the automated driving vehicle pulls over to a sidewalk side.

An automated driving vehicle disclosed in the present description is an automated driving vehicle capable of automated driving, including: a sensor that detects an object existing around the automated driving vehicle; and an operation control section that, during a period from when the automated driving vehicle under automated driving starts pulling over to a sidewalk side until the automated driving vehicle pulls over completely to the sidewalk side, causes the automated driving vehicle to stop when an object that can be an obstacle, among the objects detected by the sensor, exists in at least one of a middle front area that is an area within a predetermined distance at a middle front of the automated driving vehicle, a sidewalk-side front area that is an area within a predetermined distance at a sidewalk-side front of the automated driving vehicle, and a sidewalk-side side area that is an area within a predetermined distance on a sidewalk-side side of the automated driving vehicle, and that does not cause the automated driving vehicle to stop when the object that can be an obstacle does not exist in any of the middle front area, the sidewalk-side front area, and the sidewalk-side side area, even when the object that can be an obstacle exists in an area surrounding the automated driving vehicle other than the middle front area, the sidewalk-side front area, and the sidewalk-side side area.

According to such a configuration, during the period from when the automated driving vehicle under automated driving starts pulling over to the sidewalk side until the automated driving vehicle pulls over completely thereto, the automated driving vehicle can be prevented from being stopped when no object that can be an obstacle exists in an area located in a traveling direction of the automated driving vehicle, even when an object that can be an obstacle exists in an area that is not located in the traveling direction of the automated driving vehicle.

The operation control section may cause the automated driving vehicle to travel at reduced speed when the object that can be an obstacle does not exist in any of the middle front area, the sidewalk-side front area, and the sidewalk-side side area, and when the object that can be an obstacle exists in any one of a middle rear area that is an area within a predetermined distance at a middle rear of the automated driving vehicle and a sidewalk-side rear area that is an area within a predetermined distance at a sidewalk-side rear of the automated driving vehicle.

According to such a configuration, when there is a possibility that an object that can be an obstacle existing in an area that is not located in the traveling direction of the automated driving vehicle (specifically, any one of the middle rear area and the sidewalk-side rear area) collides with the automated driving vehicle, the possibility of a collision between the object that can be an obstacle and the automated driving vehicle can be reduced, without causing the automated driving vehicle to stop.

The operation control section may detect a moving direction of the object that can be an obstacle existing around the automated driving vehicle, based on a result of detection by the sensor, and does not need to cause the automated driving vehicle to travel at reduced speed when the object that can be an obstacle does not exist in any of the middle front area, the sidewalk-side front area, and the sidewalk-side side area, when the object that can be an obstacle exists in at least one of the middle rear area and the sidewalk-side rear area, and when the moving direction of the object that can be an obstacle is a direction away from the automated driving vehicle, or the object that can be an obstacle is at a stop.

According to such a configuration, when the possibility is low that an object that can be an obstacle collides with the automated driving vehicle even if the object that can be an obstacle exists in any one of the middle rear area and the sidewalk-side rear area, the automated driving vehicle can be prevented from being caused to travel at reduced speed unnecessarily.

During a period from when the automated driving vehicle under automated driving pulls over completely to the sidewalk side until the automated driving vehicle comes to a stop, the operation control section may cause the automated driving vehicle to stop when the object that can be an obstacle exists in the middle front area, and does not need to cause the automated driving vehicle to stop when the object that can be an obstacle does not exist in the middle front area, even when the object that can be an obstacle exists in an area surrounding the automated driving vehicle other than the middle front area.

According to such a configuration, also during the period from when the automated driving vehicle under automated driving pulls over completely to the sidewalk side until the automated driving vehicle comes to a stop, the automated driving vehicle can be prevented from being stopped when no object that can be an obstacle exists in the area located in the traveling direction of the automated driving vehicle, even when an object that can be an obstacle exists in an area that is not located in the traveling direction of the automated driving vehicle.

According to the automated driving vehicle disclosed in the present description, the automated driving vehicle can be restrained from being stopped unnecessarily when the automated driving vehicle pulls over to the sidewalk side.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
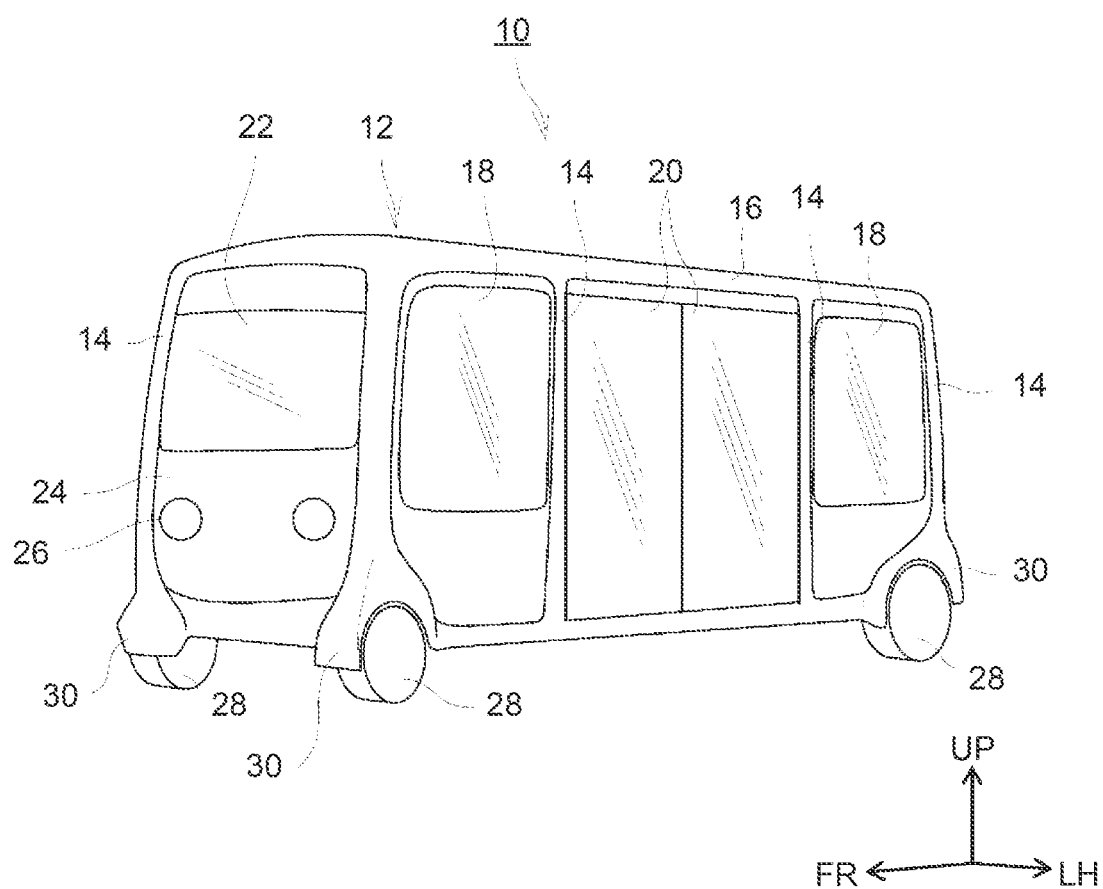
FIG. 1 is a perspective view of an automated driving vehicle according to an embodiment.

Hereinafter, a configuration of an automated driving vehicle 10 will be described with reference to the drawings. Note that in the drawings to be referenced in the following, "FR", "UP", and "LH" indicate a front side in a vehicle front-rear direction, an upper side in a vehicle height direction, and a left side in a vehicle width direction (a left side when the vehicle faces toward the front side), respectively.

FIG. 1 is a perspective view of the automated driving vehicle 10 from a front three-quarter perspective. The automated driving vehicle 10 is used for a bus that transports passengers while traveling along a predetermined route within a specific site. However, a form of using the automated driving vehicle 10 disclosed in the present description can be changed as appropriate. For example, the automated driving vehicle 10 may be used for a mobile business space. For example, the automated driving vehicle 10 may be used for a shop, such as a retailer shop that displays and sells various products, or a drinking and eating establishment that cooks and provides food and drink. As another form, the automated driving vehicle 10 may be used for an office for clerical work, a meeting with a client or the like. The automated driving vehicle 10 may also be used for a taxi or a trucking vehicle that transport a customer or goods. Moreover, scenes where the automated driving vehicle 10 is used is not limited to business scenes, and the automated driving vehicle 10 may be used, for example, for personal mobility. A traveling pattern and traveling speed of the automated driving vehicle 10 may be changed as appropriate.

The automated driving vehicle 10 is an electric vehicle including a traction motor as a prime mover, and a main battery (not shown) for supplying electricity to the traction motor is mounted under a floor of the automated driving vehicle 10. As shown in FIG. 1, the automated driving vehicle 10 does not include a hood or a trunk, and has an outer shape of an approximately rectangular cuboid with front and rear faces standing in approximately vertical positions. A boxy body 12 includes, for example, pillars 14 extending in the vehicle height direction, rails 16 extending in the vehicle front-rear direction at borders between side faces and a top face of the automated driving vehicle 10, and the like. Big window portions 18 are provided on the side faces of the automated driving vehicle 10. Moreover, a pair of slide doors 20 that open and close by sliding in the vehicle front-rear direction are provided in the middle of the left side face of the automated driving vehicle 10.

A window portion 22 functioning as a windshield and a lamp-placed portion 24 arranged below the window portion 22 are provided on the front face of the automated driving vehicle 10. Signal lamps 26 for indicating, with light, existence and behavior of the vehicle to a person outside the vehicle are placed in the lamp-placed portion 24. The rear face of the automated driving vehicle 10 is also configured almost similarly to the front face of the vehicle, with a window portion 22 and a lamp-placed portion 24 arranged one above the other.

A pair of wheels 28 are disposed in each of the vicinities of front and rear ends of the automated driving vehicle 10. In the present embodiment, lower end portions of the pillars 14, which are positioned at four corners in a plane view, are formed in bulges 30 that bulge outward in the vehicle width direction, and each wheel 28 is disposed under each bulge 30, respectively. Thus, the wheels 28 are arranged outboard in the vehicle width direction, so that the automated driving vehicle 10 can secure a wider interior space.

The automated driving vehicle 10 is a vehicle capable of automated driving. Specifically, the automated driving vehicle 10 can be driven in a plurality of driving modes including an automated driving mode, a semi-automated driving mode, and a manual driving mode. The automated driving mode and the semi-automated driving mode are modes in which the automated driving vehicle 10 is automatically driven, and the manual driving mode is a mode in which the automated driving vehicle 10 is manually driven by an operator.

The automated driving mode is a driving mode in which most of operation control is performed by a computer (an operation control section (which will be described later)) mounted in the automated driving vehicle 10. In the present description, the operation control is a concept including gear change control, vehicle speed control (including start control and stop control), or steering control. The automated driving vehicle 10 can communicate with a management center that manages and controls a plurality of automated driving vehicles 10, and the automated driving vehicle 10, in the automated driving mode, travels along a predetermined route, based on control from the management center. In the automated driving mode, although the operation control is performed by the computer in accordance with an operation instruction from the management center, only control for start from a stopped state is performed based on an operation made by the operator. The control for start from a stopped state is performed by, for example, operating a touch panel (not shown in FIG. 1) provided in the automated driving vehicle 10.

The semi-automated driving mode, similarly to the automated driving mode, is a driving mode in which most of the operation control on the automated driving vehicle 10 is performed by the operation control section. In the semi-automated driving mode, the operation control section performs the operation control, not based on an operation instruction from the management center, but based on a result of detection by a sensor (which will be described in detail later) included in the automated driving vehicle 10. In the semi-automated driving mode, only the control for start from a stopped state is also performed based on an operation made by the operator.

In the manual driving mode, the operator manually drives the automated driving vehicle 10 by operating a mechanical operation section (not shown) provided in the automated driving vehicle 10, or the touch panel.

As described above, the automated driving vehicle 10 travels along the specified route in the specific site, and in the present embodiment, the automated driving vehicle 10 travels, basically, in the automated driving mode while traveling along the specified route. The semi-automated driving mode or the manual driving mode is used during such times as when the automated driving vehicle 10 moves from a waiting place to the specified route and enters the route, and when the automated driving vehicle 10 moves out of the specified route to the waiting place.

Figure 2:
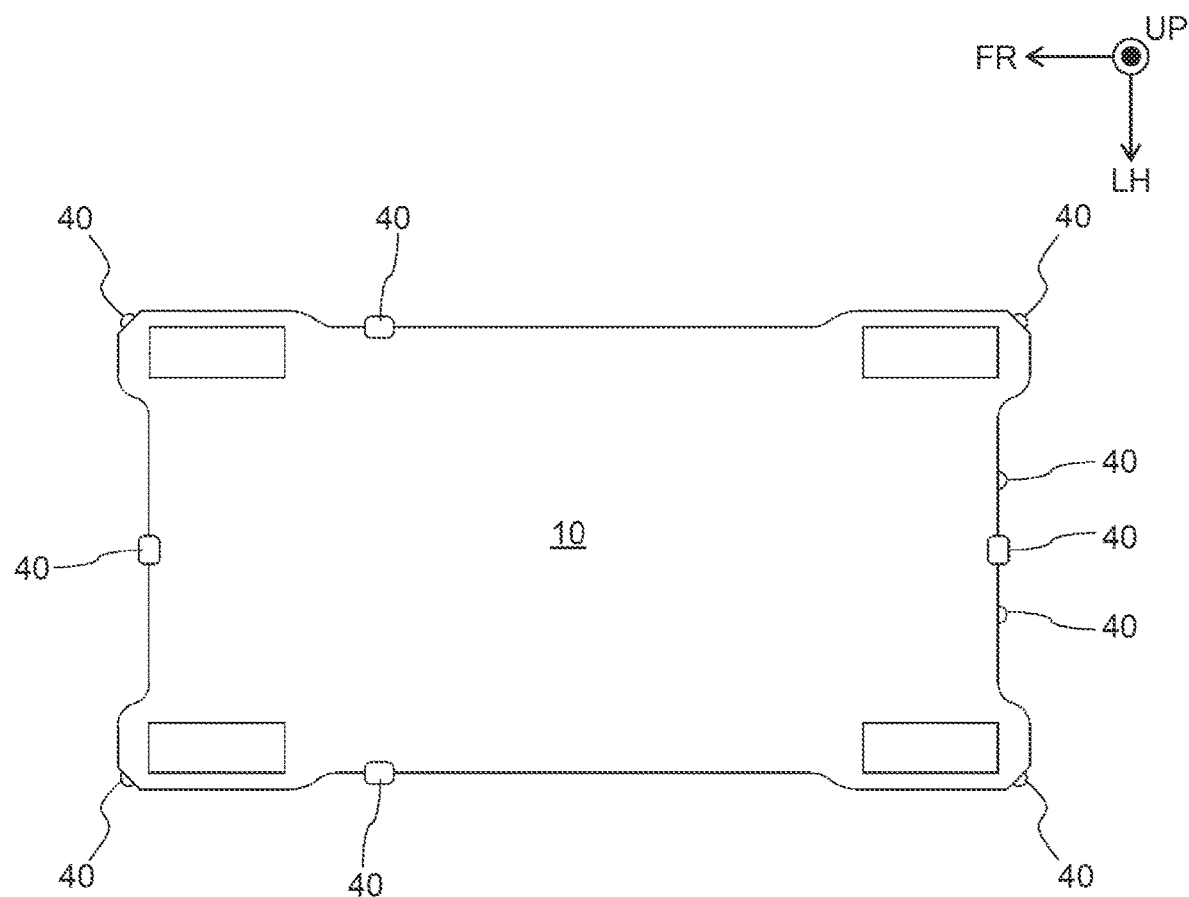
FIG. 2 is a schematic plane view showing a plurality of sensors provided to the automated driving vehicle.

The automated driving vehicle 10 is provided with a sensor that detects an object existing around the automated driving vehicle 10. FIG. 2 is a schematic plane view showing sensors 40 provided to the automated driving vehicle 10. As shown in FIG. 2, the plurality of sensors 40 are disposed on the side faces of the automated driving vehicle 10. The automated driving vehicle 10 is configured to be able to detect objects existing in a plurality of directions viewed from the automated driving vehicle 10, based on detection signals from the plurality of sensors 40. As described below, the sensors 40 are used for the operation control section to perform operation control during the semi-automated driving mode, and also used for control of causing the automated driving vehicle 10 to stop or to travel at reduced speed while the automated driving vehicle 10 under automated driving pulls over to a sidewalk side and comes to a stop.

A typical example of the sensors 40 is a camera, a lidar, a millimeter-wave radar, a clearance sonar, or the like. The lidar is a sensor that detects an object and measures a distance to a target object by using remote sensing technology using light. The millimeter-wave radar is a sensor that detects an object by using millimeter waves that are radio waves. The clearance sonar is a sensor that detects an object by using ultrasonic waves. Note that for the sensors 40, any devices can be used as long as the devices can detect an object existing around the automated driving vehicle 10.

When the sensors 40 are cameras, the automated driving vehicle 10 can detect that an object existing around the automated driving vehicle 10 is a human, based on image data acquired by any of the sensors 40. For processing of detecting the human from the image data, a known technology can be used. For example, the human can be detected from the image data acquired by any of the sensors 40, through human detection processing using a histograms of oriented gradients (HOG) features that are features represented in the form of histograms of directions of gradients of pixel values (color values or brightness values) in individual local regions of the image data.

Moreover, the automated driving vehicle 10 can detect a moving direction of an object, based on a result of detection by any of the sensors 40. For example, the moving direction of the object can be detected based on a position of the object detected by a sensor 40 immediately after a certain point of time, relative to a position of the object detected by the sensor 40 at the certain point of time. When the sensors 40 are cameras, a human is detected from image data acquired by any of the sensors 40, and then a moving direction of the human can be detected based on a direction of the human (for example, a direction of the body or a direction of the face).

Figure 3:
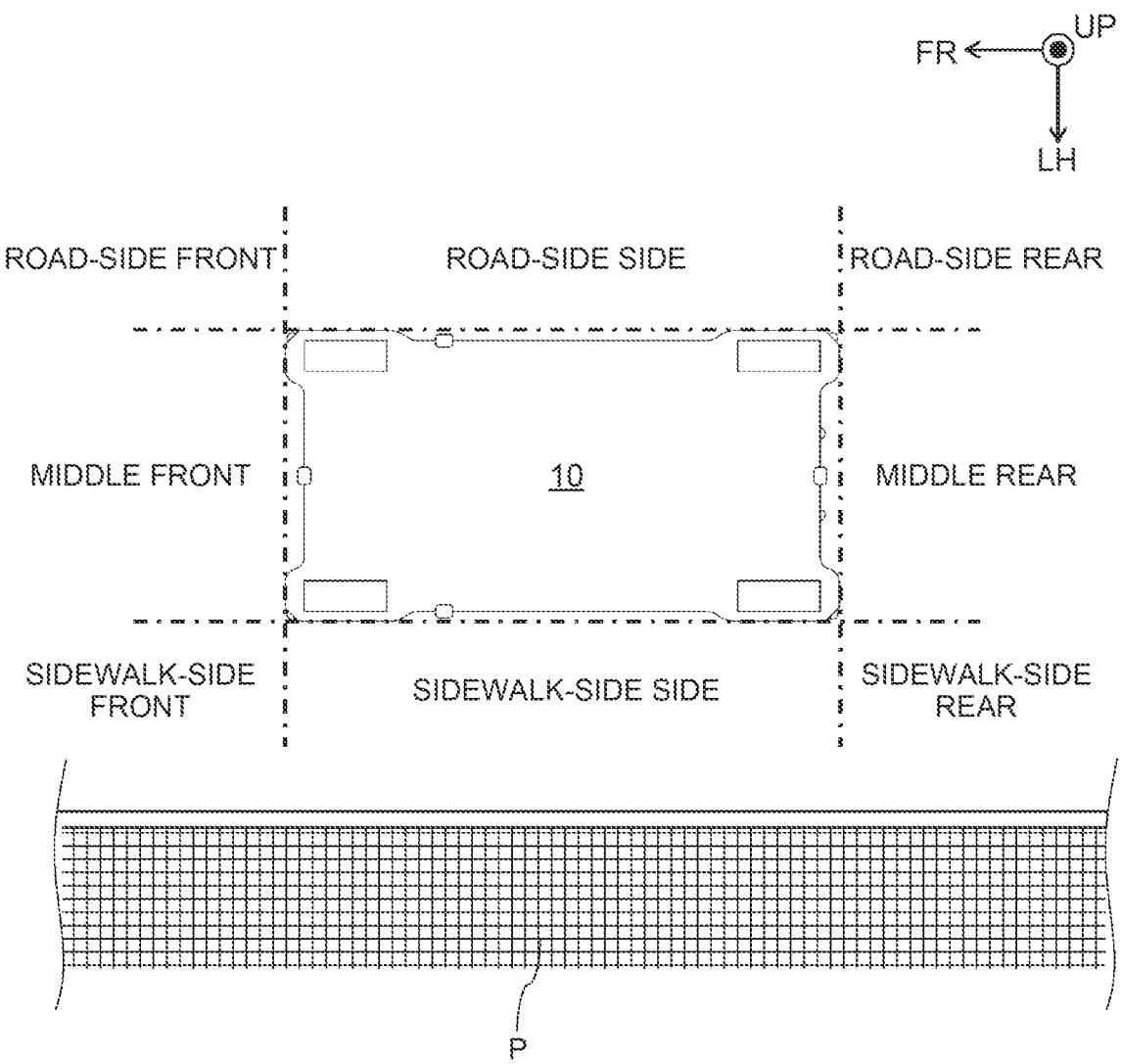
FIG. 3 shows names of areas surrounding the automated driving vehicle.

Before description of an operation control apparatus of the automated driving vehicle 10, names of areas surrounding the automated driving vehicle 10 in the present description will be clarified. FIG. 3 shows the names of the areas surrounding the automated driving vehicle 10 positioned along a sidewalk P. In the vehicle front-rear direction, an area located forward of the front end of the automated driving vehicle 10 is referred to as "front", an area located rearward of the rear end of the automated driving vehicle 10 is referred to as "rear", and an area between the front end and the rear end of the automated driving vehicle 10 is referred to as "side". In the vehicle width direction, a sidewalk P side located sideward of a side end, on the sidewalk P side, of the automated driving vehicle 10 is referred to as "sidewalk side", a road side located sideward of a side end, on the road side (that is, the opposite side to the sidewalk P side in the vehicle width direction), of the automated driving vehicle 10 is referred to as "road side", and an area between the sidewalk P-side side end and the road-side side end of the automated driving vehicle 10 is referred to as "middle".

Accordingly, as shown in FIG. 3, the front and the road side of the automated driving vehicle 10 is referred to as "road-side front", the front and the middle of the automated driving vehicle 10 is referred to as "middle front", the front and the sidewalk P side of the automated driving vehicle 10 is referred to as "sidewalk-side front", the side on the road side of the automated driving vehicle 10 is referred to as "road-side side", the side on the sidewalk P side of the automated driving vehicle 10 is referred to as "sidewalk-side side", the rear and the road side of the automated driving vehicle 10 is referred to as "road-side rear", the rear and the middle of the automated driving vehicle 10 is referred to as "middle rear", and the rear and the sidewalk P side of the automated driving vehicle 10 is referred to as "sidewalk-side rear".

Figure 4:
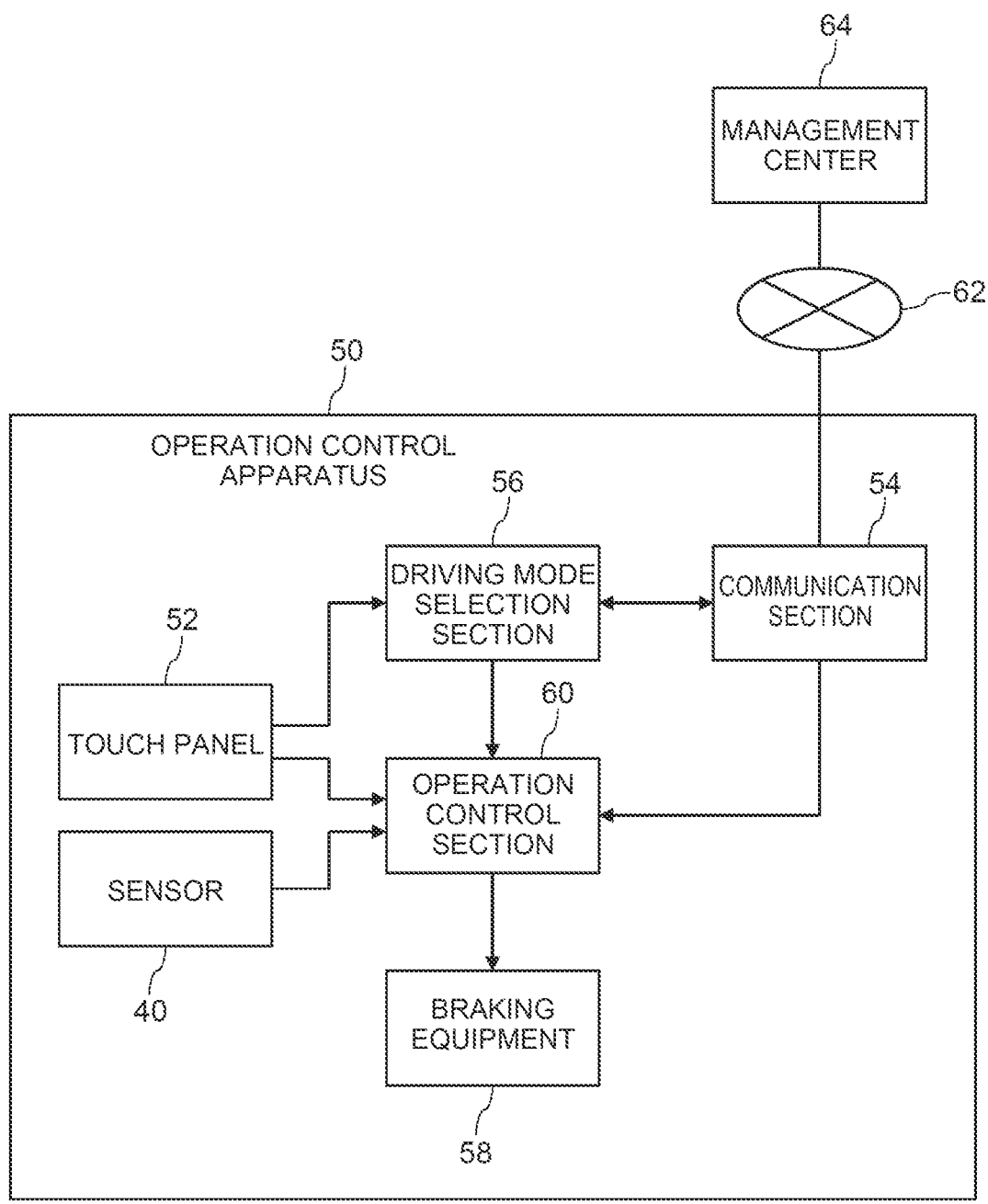
FIG. 4 is a functional block diagram of an operation control apparatus.

FIG. 4 is a functional block diagram of an operation control apparatus 50 mounted in the automated driving vehicle 10. The operation control apparatus 50 includes a touch panel 52, a communication section 54, a driving mode selection section 56, braking equipment 58, and an operation control section 60. The driving mode selection section 56 and the operation control section 60 are implemented through cooperation between hardware such as a processor and software for causing the hardware to operate.

The touch panel 52 is provided in a vehicle cabin of the automated driving vehicle 10. Various buttons are displayed on the touch panel 52, and the operator can input a control instruction for the automated driving vehicle 10 by using the buttons displayed on the touch panel 52. For example, an instruction to change driving modes of the automated driving vehicle 10 and an operation control instruction can be input by using the touch panel 52. In the present embodiment, among operation control instructions, a travel start instruction to cause the automated driving vehicle 10 to start traveling from a stopped state can be input from the touch panel 52. Needless to say, the touch panel 52 may be configured to allow an operation control instruction for a travel start instruction to be input. Moreover, in the present embodiment, in addition to such an operation control instruction, an equipment control instruction for equipment (turn signals, a horn, headlights, an air-conditioner, wipers, and the like) included in the automated driving vehicle 10 can be input by using the touch panel 52.

The communication section 54 is configured by using, for example, a network adapter and the like, and fulfills a function of communicating with a management center 64 through a communication circuit 62 such as the Internet. The communication section 54 transmits information related to the automated driving vehicle 10 to the management center 64. For example, the communication section 54 intermittently (for example, at intervals of one second) transmits a current position and a current speed of the automated driving vehicle 10, vehicle identification information for identifying the automated driving vehicle 10, and the like to the management center 64. When the driving mode of the automated driving vehicle 10 is changed, the communication section 54 transmits information indicating a driving mode after change to the management center 64. Moreover, the communication section 54 receives an operation control instruction or the like from the management center 64.

The driving mode selection section 56 selects a driving mode for the automated driving vehicle 10 from among the automated driving mode, the semi-automated driving mode, and the manual driving mode, based on an instruction to change driving modes input by the operator from the touch panel 52. As described above, when the driving mode selection section 56 selects the automated driving mode or the semi-automated driving mode, the automated driving vehicle 10 performs automated driving.

The braking equipment 58 includes a brake actuator, a brake wheel cylinder that is attached to a wheel 28 (see FIG. 1) and brakes the wheel 28 (that is, the automated driving vehicle 10), and the like. The brake actuator may be an electric actuator, and adjusts hydraulic pressure of the brake wheel cylinder, so that the brake wheel cylinder adjusts braking force applied to the wheel 28. The brake actuator can adjust the braking force of the brake wheel cylinder, based on a braking instruction received from the operation control section 60. Thus, the braking equipment 58 causes the automated driving vehicle 10 to slow down, based on the braking instruction from the operation control section 60.

The operation control section 60 performs automated driving control of causing the automated driving vehicle 10 to perform automated driving, based on an operation control instruction input from the touch panel 52, an operation control instruction received from the management center 64, a result of detection by the sensors 40, or the like.

When the operator inputs a travel start instruction from the touch panel 52 in a state where the driving mode of the automated driving vehicle 10 is the automated driving mode or the semi-automated driving mode and where the automated driving vehicle 10 is at a stop, the operation control section 60 causes the automated driving vehicle 10 to start traveling by automated driving. Thereafter, the operation control section 60 implements the automated driving in accordance with an operation control instruction received from the management center 64 (in the case of the automated driving mode), or in accordance with a detection signal from any of the sensors 40 (in the case of the semi-automated driving mode).

The operation control section 60 constantly monitors results of detection by the sensors 40 during automated driving, in other words, when the driving mode of the automated driving vehicle 10 is the automated driving mode or the semi-automated driving mode and the automated driving vehicle 10 is traveling. In such a situation, when an object that can be an obstacle, among objects detected by the sensors 40, exists in an area within a predetermined distance from the automated driving vehicle 10, the operation control section 60, as a rule, controls the braking equipment 58 and causes the automated driving vehicle 10 to immediately stop for safety.

The predetermined distance here may be predetermined by a manager of the automated driving vehicle 10, or the like. When the sensors 40 have a relatively short maximum range of detection (for example, when the sensors 40 are clearance sonars or the like), the maximum range of detection of the sensors 40 may be used for the predetermined distance.

Not all objects detected by the sensors 40 are included as objects that can be an obstacle. An object that can be an obstacle is an object that is movable within a road, or an object that cannot be predicted to approach the automated driving vehicle 10 when the automated driving vehicle 10 travels along the predetermined route. The objects that can be an obstacle include a human, another vehicle (including a motorcycle, a bicycle, or the like), an animal, or an obstacle (a fallen rock, an accident vehicle, or the like) that is not perceived by the management center 64. On the other hand, the objects that can be an obstacle do not include an object that does not move and that is known beforehand to approach to the automated driving vehicle 10 when the automated driving vehicle 10 travels along the predetermined route, such as a curb, a road sign, a traffic light, a bus stop, or a utility pole.

Object information related to an object that is not included in the objects that can be an obstacle can be acquired based on map information or the like, and such object information is stored in a memory in the operation control apparatus 50. Accordingly, the operation control section 60 determines, based on the object information, whether or not an object detected by any of the sensors 40 applies to an object that can be an obstacle, and then when an object that can be an obstacle exists in an area within the predetermined distance from the automated driving vehicle 10, the operation control section 60 controls the braking equipment 58 and causes the automated driving vehicle 10 to stop, as a rule.

Note that when the automated driving vehicle 10 can detect a sidewalk based on a detection signal from any of the sensors 40, the automated driving vehicle 10 may exclude an object (for example, a pedestrian) on the sidewalk from the objects that can be an obstacle.

Figure 5:
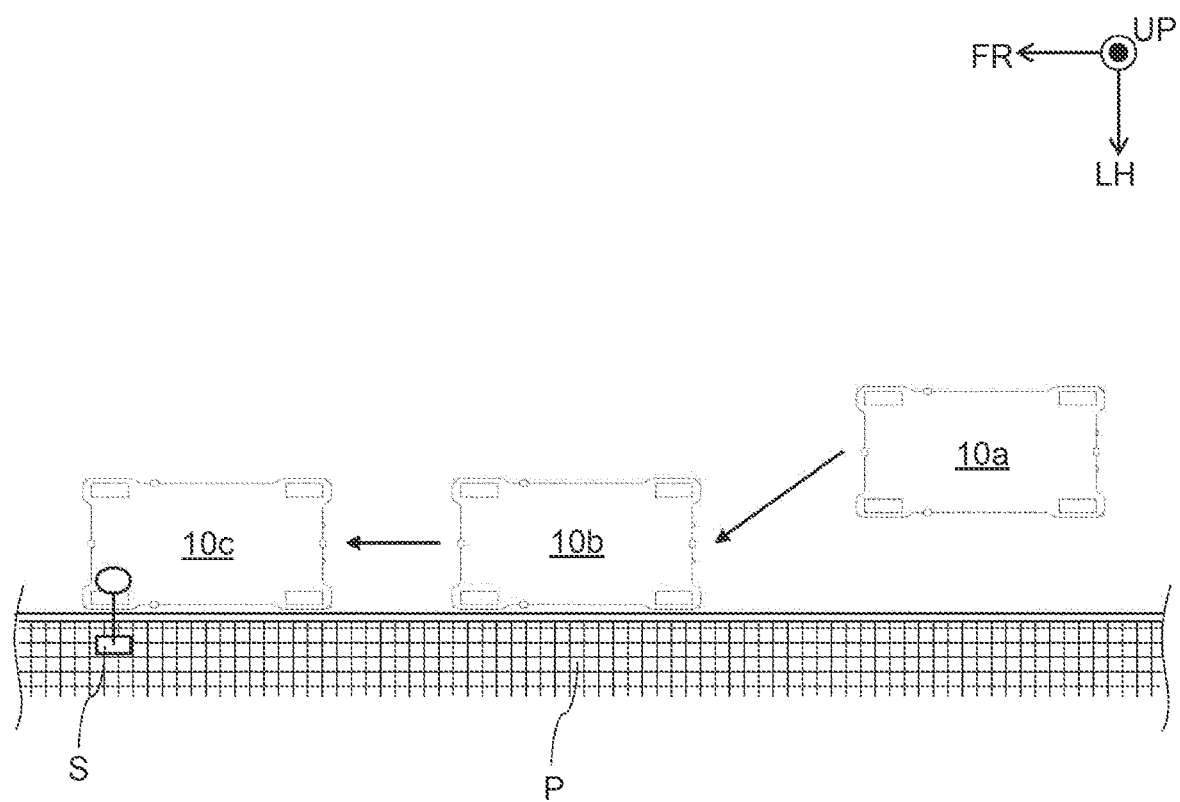
FIG. 5 is a schematic plane view showing movement of the automated driving vehicle when the automated driving vehicle pulls over to a sidewalk side until the automated driving vehicle comes to a stop.

When the automated driving vehicle 10 is under automated driving, in other words, when the driving mode of the automated driving vehicle 10 is the automated driving mode or the semi-automated driving mode and the automated driving vehicle 10 is traveling, there are some cases where the operation control section 60 performs pulling-over control of pulling the automated driving vehicle 10 over to the sidewalk side. In the present embodiment, as shown in FIG. 5, it is assumed that the automated driving vehicle 10 is used for a bus, and that the pulling-over control is performed immediately before the automated driving vehicle 10 arrives at a bus stop S. In FIG. 5, the pulling-over control is control of causing the automated driving vehicle 10 to move from a position indicated by a reference sign 10*a* to a position indicated by a reference sign 10*b*. In the present embodiment, post-pulling-over stop control (control of causing the automated driving vehicle 10 at the position indicated by the reference sign 10*b* to stop at a position indicated by a reference sign 10*c*) is performed. In the post-pulling-over stop control, the automated driving vehicle 10 is caused to stop along the sidewalk P after the automated driving vehicle 10 pulls over completely to the sidewalk P side (that is, after the pulling-over control). However, a situation where the pulling-over control is performed is not limited to the above-described case. For example, the pulling-over control is performed in a case where the automated driving vehicle 10 enters the sidewalk P, where the automated driving vehicle 10 turns left, where the automated driving vehicle 10 is caused to stop at a parking space on a road along a sidewalk, where the automated driving vehicle 10, as a taxi, allows a passenger to board or alight, or the like.

While the pulling-over control is being performed, in other words, during a period from when the automated driving vehicle 10 starts pulling over to the sidewalk P side until the automated driving vehicle 10 pulls over completely thereto (while the automated driving vehicle 10 moves from the position indicated by the reference sign 10*a* to the position indicated by the reference sign 10*b* in FIG. 5), the operation control section 60, according to the rule, controls the braking equipment 58 and causes the automated driving vehicle 10 to immediately stop when an object that can be an obstacle exists in at least one of a middle front area that is an area within a predetermined distance at the middle front of the automated driving vehicle 10, a sidewalk-side front area that is an area within a predetermined distance at the sidewalk-side front of the automated driving vehicle 10, and a sidewalk-side side area that is an area within a predetermined distance on the sidewalk-side side of the automated driving vehicle 10. The reason is that while the automated driving vehicle 10 is pulling over to the sidewalk P side, the middle front area, the sidewalk-side front area, and the sidewalk-side side area are located in the traveling direction of the automated driving vehicle 10, so when an object that can be an obstacle exists in any of the areas, the object may collide with the automated driving vehicle 10.

During the period from when the automated driving vehicle 10 starts pulling over to the sidewalk P side until the automated driving vehicle 10 pulls over completely thereto, the operation control section 60 does not cause the automated driving vehicle 10 to stop when no object that can be an obstacle exists in any of the middle front area, the sidewalk-side front area, and the sidewalk-side side area, even when an object that can be an obstacle exists in any of the other areas surrounding the automated driving vehicle 10 than the middle front area, the sidewalk-side front area, and the sidewalk-side side area (that is, areas at the road-side front, on the road-side side, at the road-side rear, at the middle rear, and at the sidewalk-side rear). The reason is that while the automated driving vehicle 10 is pulling over to the sidewalk P side, the other areas than the middle front area, the sidewalk-side front area, and the sidewalk-side side area are not located in the traveling direction of the automated driving vehicle 10, so even if an object that can be an obstacle exists in any of the other areas, the possibility is low that the object collides with the automated driving vehicle 10. Thus, the automated driving vehicle 10 is restrained from being stopped unnecessarily when the automated driving vehicle 10 pulls over to the sidewalk P side.

During the period from when the automated driving vehicle 10 starts pulling over to the sidewalk P side until the automated driving vehicle 10 pulls over completely thereto, the operation control section 60 may control the braking equipment 58 and cause the automated driving vehicle 10 to travel at reduced speed (a speed of approximately 10 km or lower per hour) when no object that can be an obstacle exists in any of the middle front area, the sidewalk-side front area, and the sidewalk-side side area, and when an object that can be an obstacle exists in any one of a middle rear area that is an area within a predetermined distance at the middle rear of the automated driving vehicle 10 and a sidewalk-side rear area that is an area within a predetermined distance at the sidewalk-side rear of the automated driving vehicle 10.

It is conceivable that while the automated driving vehicle 10 is performing the pulling-over control, an object that can be an obstacle existing in an area that is not located in the traveling direction of the automated driving vehicle 10 (specifically, any one of the middle rear area and the sidewalk-side rear area) may collide with the automated driving vehicle 10. For example, there is a case where an object that can be an obstacle (for example, a motorcycle or a bicycle) existing in the sidewalk-side rear area continues moving forward without noticing pulling-over of the automated driving vehicle 10. Another conceivable case is that when the automated driving vehicle 10 starts the pulling-over control, an object that can be an obstacle (for example, a motorcycle) existing in the middle rear area attempts to pass the automated driving vehicle 10 from the sidewalk P side. In such cases, there is a possibility that the object that can be an obstacle existing in the sidewalk-side rear area or the middle rear area collides with the automated driving vehicle 10 that is pulling over. On the other hand, since the middle rear area and sidewalk-side rear area are not located in the traveling direction of the automated driving vehicle 10 that is pulling over, it can be said to be less necessary to cause the automated driving vehicle 10 to stop when an object that can be an obstacle exists in any one of the middle rear area and the sidewalk-side rear area, than when an object that can be an obstacle exists in any one of the middle front area, the sidewalk-side front area, and the sidewalk-side side area. Accordingly, when an object that can be an obstacle exists in any one of the middle rear area and the sidewalk-side rear area, the operation control section 60 causes the automated driving vehicle 10 to travel at reduced speed, in order to reduce the possibility of a collision with the object that can be an obstacle existing in any one of the middle rear area and the sidewalk-side rear area, while unnecessarily causing the automated driving vehicle 10 to stop as less frequently as possible.

As described above, the operation control section 60 can detect a moving direction of an object that can be an obstacle existing around the automated driving vehicle 10, based on a result of detection by any of the sensors 40. Here, the operation control section 60 may cause the automated driving vehicle 10 not to travel at reduced speed when no object that can be an obstacle exists in any of the middle front area, the sidewalk-side front area, and the sidewalk-side side area, when an object that can be an obstacle exists in any one of the middle rear area and the sidewalk-side rear area, and when the moving direction of the object that can be an obstacle is a direction away from the automated driving vehicle 10, or the object that can be an obstacle is at a stop. The reason is that even when an object that can be an obstacle exists in any one of the middle rear area and the sidewalk-side rear area, the possibility is considerably low that the object that can be an obstacle collides with the automated driving vehicle 10 as a result of the object that can be an obstacle in the sidewalk-side rear area continuing moving forward, or the object that can be an obstacle in the middle rear area attempting to pass the automated driving vehicle 10 from the sidewalk P side when the moving direction of the object that can be an obstacle is a direction away from the automated driving vehicle 10, or when the object that can be an obstacle is at a stop, as described above. Thus, the automated driving vehicle 10 is restrained from being caused to travel at reduced speed unnecessarily.

While the post-pulling-over stop control is being performed, in other words, during a period from when the automated driving vehicle 10 pulls over completely to the sidewalk P side until the automated driving vehicle 10 comes to a stop (while the automated driving vehicle 10 moves from the position indicated by the reference sign 10b and comes to a stop at the position indicated by the reference sign 10c in FIG. 5), the operation control section 60, according to the rule, controls the braking equipment 58 and causes the automated driving vehicle 10 to immediately stop when an object that can be an obstacle exists in the middle front area. During the period from when the automated driving vehicle 10 pulls over completely to the sidewalk P side until the automated driving vehicle 10 comes to a stop, the operation control section 60 does not cause the automated driving vehicle 10 to stop when no object that can be an obstacle exists in the middle front area, even when an object that can be an obstacle exists in any of the other areas surrounding the automated driving vehicle 10 than the middle front area (that is, the areas at the road-side front, on the road-side side, at the road-side rear, at the middle rear, at the sidewalk-side front, on the sidewalk-side side, and at the sidewalk-side rear). The reason is that the middle front is the traveling direction of the automated driving vehicle 10 during the period from when the automated driving vehicle 10 pulls over completely to the sidewalk P side until the automated driving vehicle 10 comes to a stop. Thus, the automated driving vehicle 10 is restrained from being stopped unnecessarily during the period from when the automated driving vehicle 10 pulls over completely to the sidewalk P side until the automated driving vehicle 10 comes to a stop.

As described above, the operation control section 60 changes a stop target area that is a target area in which the automated driving vehicle 10 is caused to immediately stop when an object that can be an obstacle exists in the area, between during the pulling-over control and during the post-pulling-over stop control. Specifically, the stop target areas during the pulling-over control are the middle front area, the sidewalk-side front area, and the sidewalk-side side area, and the stop target area during the post-pulling-over stop control is only the middle front area. This is due to a fact that the traveling direction of the automated driving vehicle 10 differs between during the pulling-over control and during the post-pulling-over stop control.

Although the embodiment of the automated driving vehicle according to the present disclosure has been described hereinabove, the automated driving vehicle according to the present disclosure is not limited to the above-described embodiment, and various changes can be made without departing from the gist of the present disclosure.

What is claimed is:

1. An automated driving vehicle capable of automated driving, comprising:
a sensor that detects an object existing around the automated driving vehicle; and
a processor that, during a period from when the automated driving vehicle under automated driving starts pulling over to a sidewalk side until the automated driving vehicle pulls over completely to the sidewalk side, causes the automated driving vehicle to stop when an object that can be an obstacle, among the objects detected by the sensor, exists in at least one of a middle front area that is an area within a predetermined distance at a middle front of the automated driving vehicle, a sidewalk-side front area that is an area within a predetermined distance at a sidewalk-side front of the automated driving vehicle, and a sidewalk-side side area that is an area within a predetermined distance on a sidewalk-side side of the automated driving vehicle, and that does not cause the automated driving vehicle to stop when the object that can be an obstacle does not exist in any of the middle front area, the sidewalk-side front area, and the sidewalk-side side area, even when the object that can be an obstacle exists in an area surrounding the automated driving vehicle other than the middle front area, the sidewalk-side front area, and the sidewalk-side side area, wherein
the processor causes the automated driving vehicle to travel at reduced speed when the object that can be an obstacle does not exist in any of the middle front area, the sidewalk-side front area, and the sidewalk-side side area, and when the object that can be an obstacle exists in any one of a middle rear area that is an area within a predetermined distance at a middle rear of the automated driving vehicle and a sidewalk-side rear area that is an area within a predetermined distance at a sidewalk-side rear of the automated driving vehicle, and
during the period from when the automated driving vehicle under automated driving starts pulling over to the sidewalk side until the automated driving vehicle pulls over completely to the sidewalk side before the automated driving vehicle comes to a stop at a stop position, the processor causes the automated driving vehicle to stop at a position before the stop position when an object that can be an obstacle exists in at least one of the middle front area, the sidewalk-side front area, and the sidewalk-side side area.

2. The automated driving vehicle according to claim 1, wherein the processor
detects a moving direction of the object that can be an obstacle existing around the automated driving vehicle, based on a result of detection by the sensor, and
does not cause the automated driving vehicle to travel at reduced speed when the object that can be an obstacle does not exist in any of the middle front area, the sidewalk-side front area, and the sidewalk-side side area, when the object that can be an obstacle exists in at least one of the middle rear area and the sidewalk-side rear area, and when the moving direction of the object that can be an obstacle is a direction away from the automated driving vehicle, or the object that can be an obstacle is at a stop.

3. The automated driving vehicle according to claim 1, wherein during a period from when the automated driving vehicle under automated driving pulls over completely to the sidewalk side until the automated driving vehicle comes to a stop, the processor causes the automated driving vehicle to stop when the object that can be an obstacle exists in the middle front area, and does not cause the automated driving vehicle to stop when the object that can be an obstacle does not exist in the middle front area, even when the object that can be an obstacle exists in an area surrounding the automated driving vehicle other than the middle front area.

* * * * *